(12) United States Patent
Brewer et al.

(10) Patent No.: US 6,594,154 B1
(45) Date of Patent: Jul. 15, 2003

(54) KEY CHAIN HOLDERS FOR SMALL ELECTRONIC CIRCUIT CARDS

(75) Inventors: Wesley G. Brewer, Los Gatos, CA (US); Robert F. Wallace, Sunnyvale, CA (US); Robert C. Miller, San Jose, CA (US)

(73) Assignee: SanDisk Corporation, Sunnyvale, CA (US)

( * ) Notice: Subject to any disclaimer, the term of this patent is extended or adjusted under 35 U.S.C. 154(b) by 0 days.

(21) Appl. No.: 09/707,744

(22) Filed: Nov. 6, 2000

(51) Int. Cl.[7] ................................................ H05K 7/14
(52) U.S. Cl. ...................... 361/801; 361/737; 361/752; 361/802; 235/492
(58) Field of Search ................................ 361/736, 737, 361/752, 801, 802; 206/232, 38.1, 37.1; 235/492

(56) References Cited

U.S. PATENT DOCUMENTS

| | | | | |
|---|---|---|---|---|
| 4,521,981 A | * | 6/1985 | Kasprzycki et al. | 283/56 |
| 5,467,871 A | * | 11/1995 | DeField | 206/232 |
| 5,929,427 A | * | 7/1999 | Harada et al. | 235/486 |
| 6,112,996 A | | 9/2000 | Matsuo | |

FOREIGN PATENT DOCUMENTS

AU  646874  3/1994

OTHER PUBLICATIONS

MMCA Technical Committee, "The MultiMediaCard—System Specification," Version 2.11, Jun., 1999.
SanDisk Corporation, "MultiMediaCard Product Manual," Revision 2, Apr. 2000.
SanDisk MultiMediaCard Product Manual, Rev. 2 ©2000 SanDisk Corporation, pps. 2–86.
MultiMediaCard System Specification Version 2.2 Official Release © Jan. 2000 MMCA Technical Committee, pps. 2–123.
MultiMediaCard System Specification Version 2.11 Official Release © Jun. 1999 MMCA Technical Committee, pps. 2–123.
MMCA Technical Committee, "The MultiMediaCard—System Specification," Version 2.11, Jun., 1999.
SanDisk Corporation, "MultiMediaCard Product Manual," Revision 2, Apr. 2000.

* cited by examiner

*Primary Examiner*—David L. Talbott
*Assistant Examiner*—Tuan Dinh
(74) *Attorney, Agent, or Firm*—Parsons Hsue & de Runtz LLP

(57) ABSTRACT

A holder for one or more electronic circuit cards, such as very small non-volatile memory cards, allows one or more such cards to be easily inserted and removed by hand. The holder, with a card inserted, may conveniently be carried on the person such as by attachment to a key ring or chain.

27 Claims, 6 Drawing Sheets

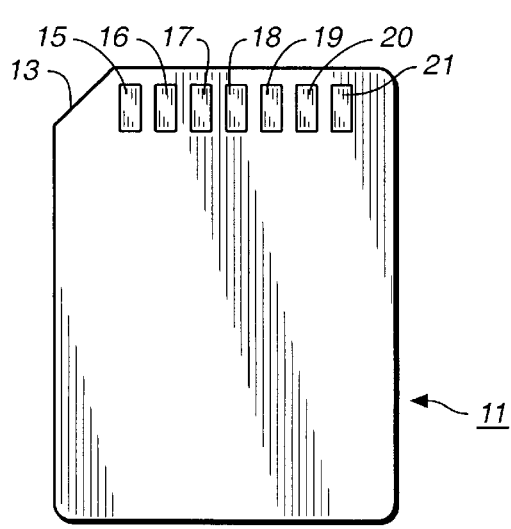
FIG._1A
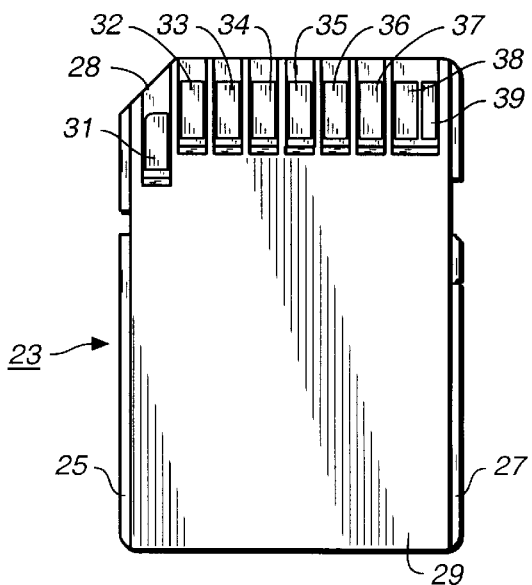
FIG._2A
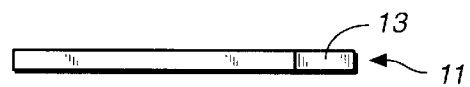
FIG._1B
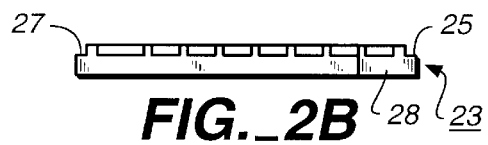
FIG._2B
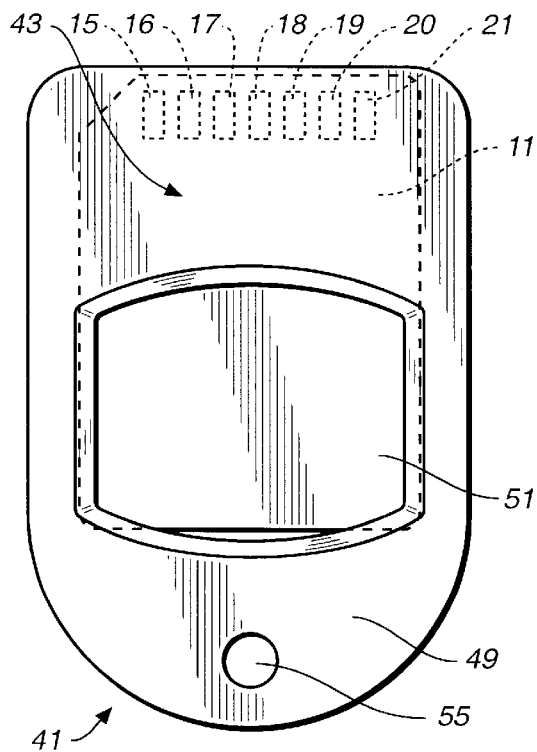
FIG._4
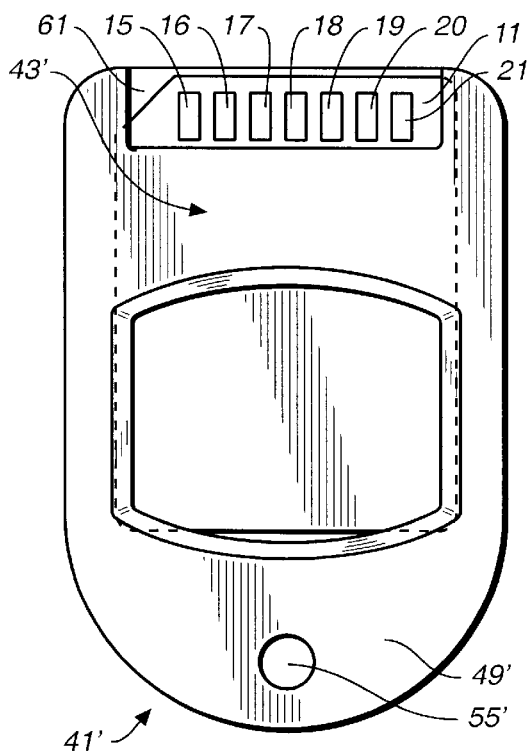
FIG._5

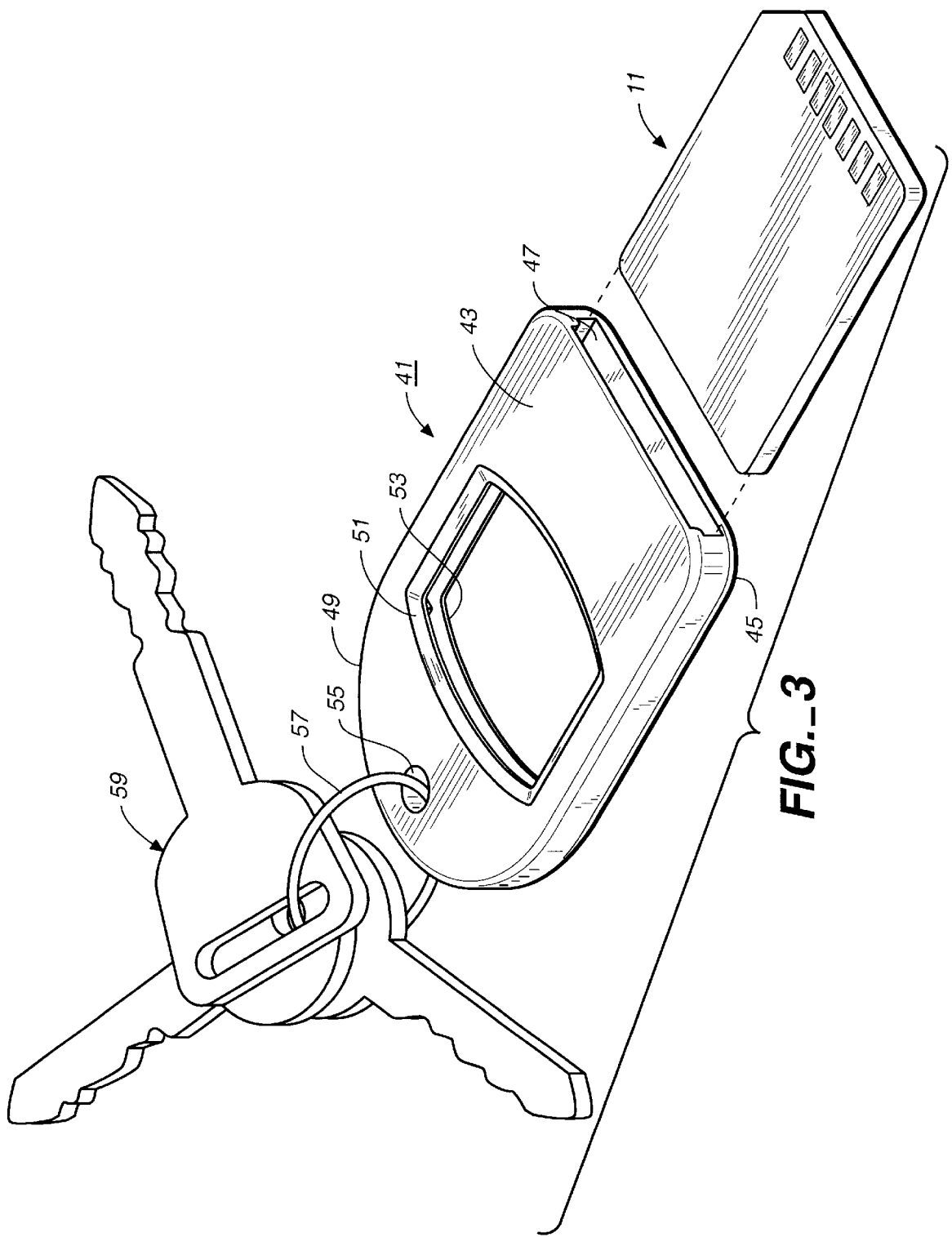
FIG._3

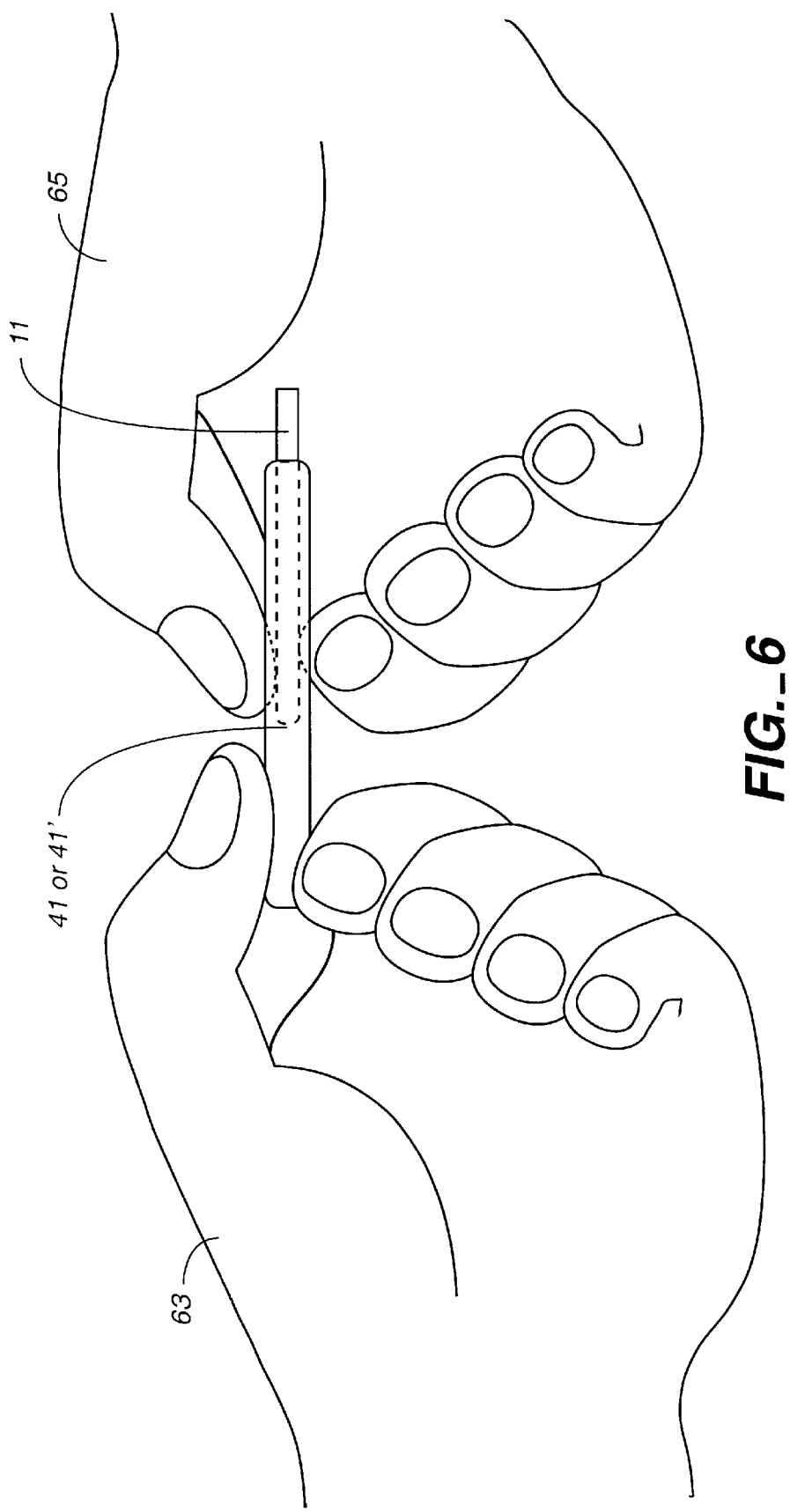
FIG._6

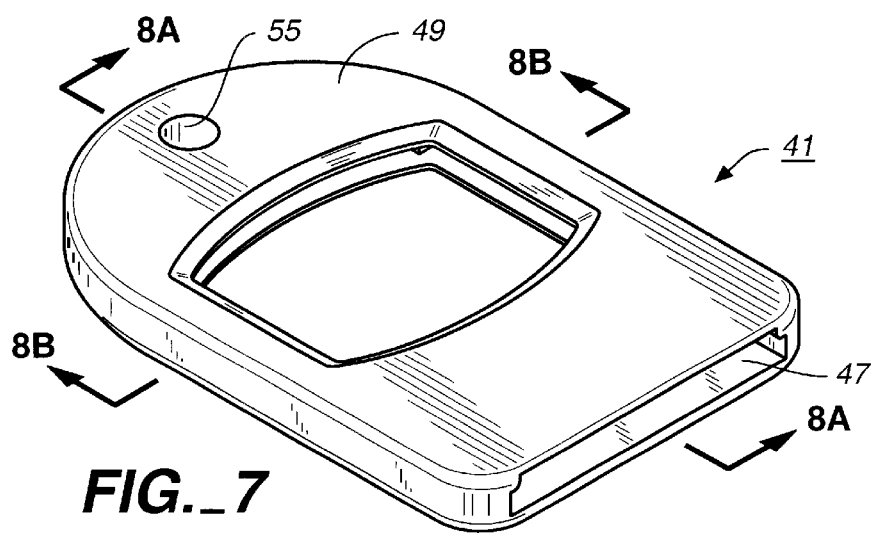
FIG._7
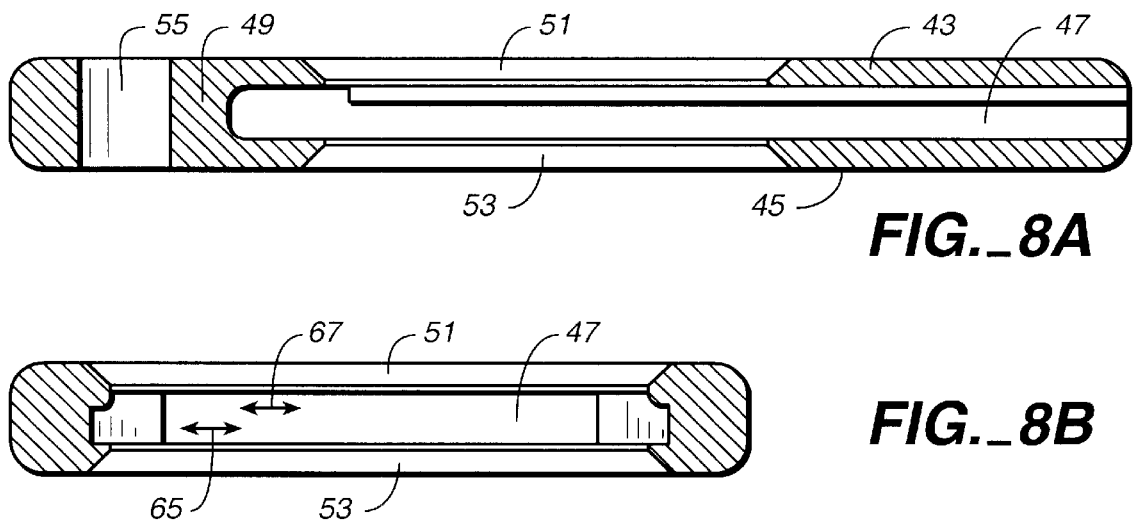
FIG._8A
FIG._8B
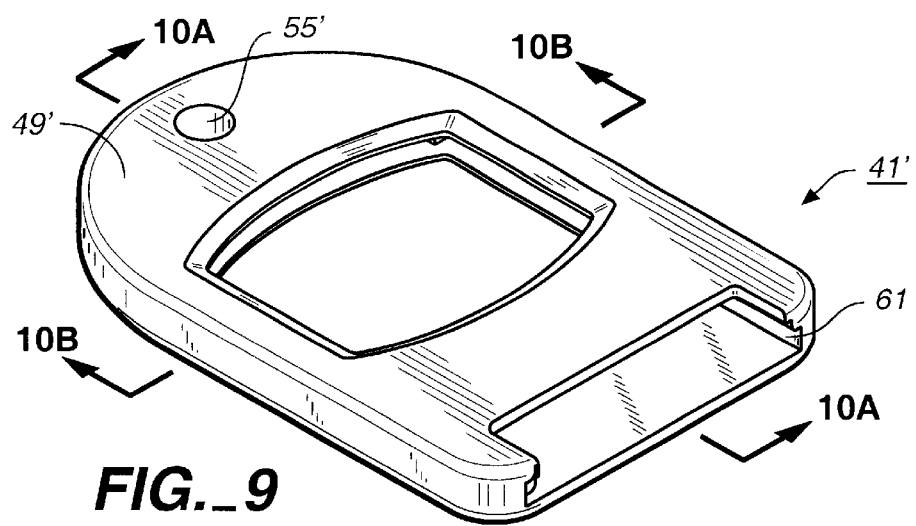
FIG._9

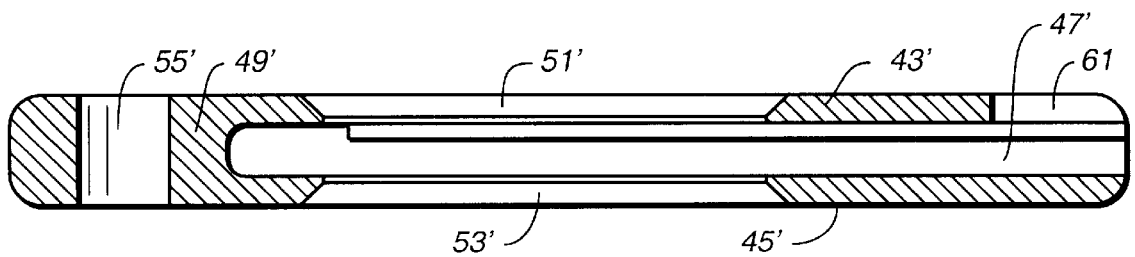
FIG._10A
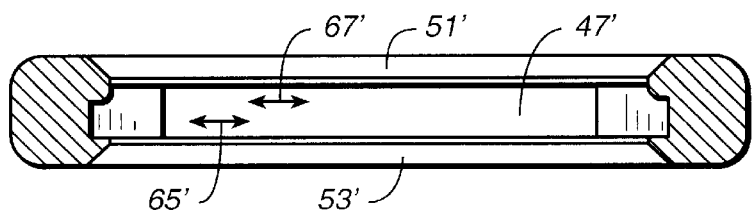
FIG._10B
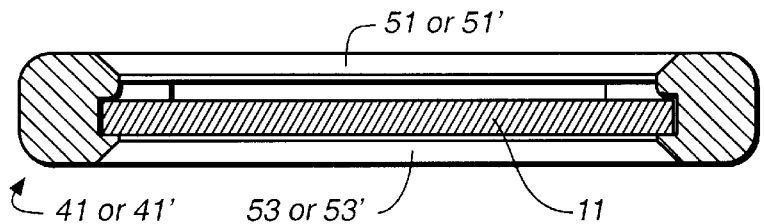
FIG._11
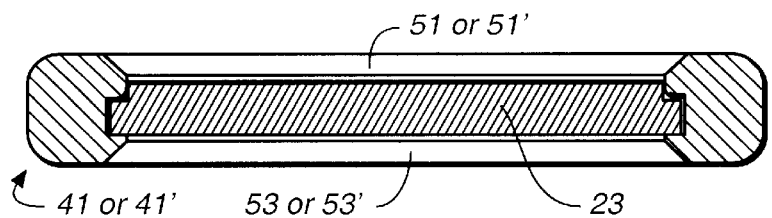
FIG._12
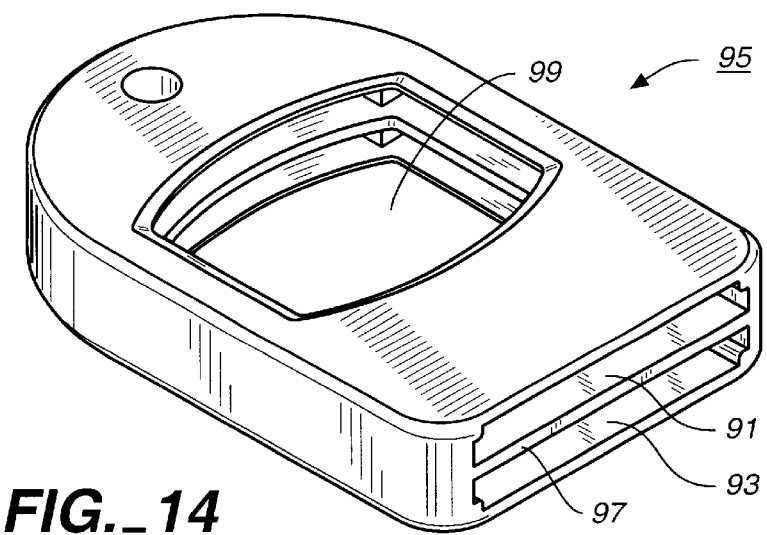
FIG._14

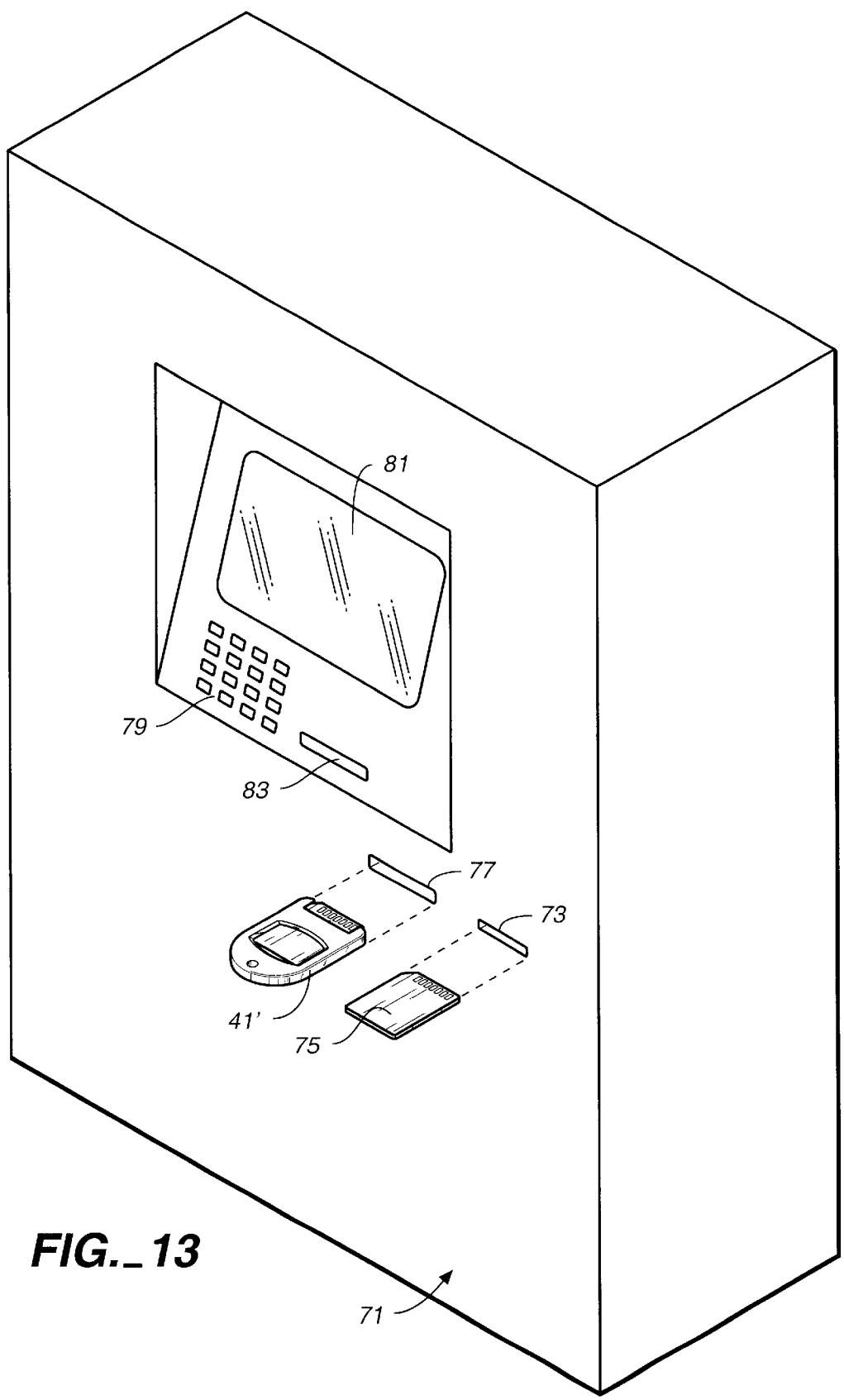
FIG._13

KEY CHAIN HOLDERS FOR SMALL ELECTRONIC CIRCUIT CARDS

BACKGROUND OF THE INVENTION

This invention relates, generally, to the storage, handling and use of removable electronic circuit cards, and, more specifically, to the storage, handling and use of the related MultiMediaCard ("MMC") and Secure Digital ("SD") non-volatile memory cards.

The physical and electrical specifications for the MMC are given in "The MultiMediaCard System Specification" that is updated and published from time-to-time by the MultiMediaCard Association ("MMCA") of Cupertino, California. Versions 2.11 and 2.2 of that Specification, dated June 1999 and January 2000, respectively, are expressly incorporated herein by this reference. MMC products having varying storage capacity up to 64 megabytes in a single card are currently available from SanDisk Corporation of Sunnyvale, California, assignee of the present application, and a capacity of 128 megabytes is expected before long. The MMC products are described in a "MultiMediaCard Product Manual," Revision 2, dated April 2000, published by SanDisk corporation, which Manual is also expressly incorporated herein by this reference. The MMC card has a rectangular shape, with dimensions of 24 by 32 mm., and a 1.4 mm. thickness. Seven electrical contacts are provided on the outside of the card in a row along one end.

The newer SD Card is similar to the MMC card, having the same size except for an increased thickness that accommodates an additional memory chip. It's thickness is 2.1 mm., with narrow side rails along its length having a 1.4 mm. thickness. A primary difference between the two cards is that the SD Card includes three additional electrical contacts in the row along one edge. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of a host system to which the card is connected need to be made in order to accommodate both types of cards.

The small size of these and other forms of commercial non-volatile memory cards has many advantages, including the ability to insert them into very small host devices, such as cellular telephones, MP-3 audio players of music that is stored on such cards and in various hand held personal electronic devices. Further, very little space is required for storage of the memory cards when not being used in such devices. But the small size of the cards subjects them to the possibility of being misplaced so that a specific card is not readily available when desired to be inserted into such a device.

SUMMARY OF THE INVENTION

Accordingly, a holder for one or more small integrated circuit cards is provided where the card(s) is easily inserted and removed by hand, the holder is easy to handle when the card(s) is inserted, and the holder may conveniently be carried on the person such as by attachment to a key ring or chain. In one form, the holder is made from molded plastic and contains one or more slots that are each adapted to have a card inserted entirely therein and retained by friction in a manner that allows it to be easily removed by hand. To facilitate removal, as an example, the holder exposes a portion of the card surface through a side opening that allows the user to touch and frictionally engage the card with a finger. The holder may be transparent to allow any label on the card to be read without having to remove the card from the holder. A notch may be included in one wall of the holder adjacent the card opening in order to expose a row of contacts on the card, thus allowing the card to be inserted into a receptacle of electronic equipment without having to first remove the card from the holder. Two or more card slots may also be included in the holder. In a specific embodiment, the cross-sectional shape of the slot is made to accommodate both of the MMC and SD non-volatile memory cards.

Additional features and advantages of the present invention will become apparent from the following description, which should be taken in conjunction with the accompanying drawings.

BRIEF DESCRIPTION OF THE DRAWINGS

FIG. 1A shows the MMC card in plan view, and FIG, 1B shows a top edge view he MMC card;

FIG. 2A shows the SD card in plan view, and FIG. 2B shows a top edge view of the SD card;

FIG. 3 illustrates carrying a card holder according to a first embodiment of the present invention on a personal key ring;

FIG. 4 is a plan view of the card holder according to a first embodiment thereof, with an MMC card being carried therein;

FIG. 5 is a plan view of the card holder according to a second embodiment of the present invention, with an MMC card being carried therein;

FIG. 6 illustrates one way of inserting or removing a card by hand from a card holder according to either embodiment;

FIG. 7 is an isometric view of the card holder of the first embodiment, without a card therein;

FIG. 8A is a sectional view of the card holder of the first embodiment according to FIG. 7, taken along section 8A—8A thereof, FIG. 8B is a sectional view of FIG. 7 taken along section 8B—8B thereof;

FIG. 9 is an isometric view of the card holder of the second embodiment, without card therein;

FIG. 10A is a sectional view of the card holder of FIG. 9, taken along section 10A—10A thereof, and FIG. 10B is a sectional view of FIG. 7 taken along section 10B—10B thereof;

FIG. 11 sows the position of a MMC card in either of the first or second embodiments of the card holder at the sections of FIGS. 8B and 10B, respectively;

FIG. 12 shows the position of a SD card in either of the first or second embodiments of the card holder at the sections of FIGS. 8B and 10B, respectively;

FIG. 13 generally illustrates a kiosk that accepts a memory card either by itself or when carried in a holder of the second embodiment herein; and FIG. 14 is an isometric view of a card holder according to a third embodiment of the present invention, wherein space is provided for carrying two cards in a holder having features of the first embodiment.

DESCRIPTION OF THE SPECIFIC EMBODIMENTS

FIGS. 1A and 1B show a MMC memory card 11. The card 11 is rectangular in plan view, with one corner 13 cut off and the other three corners rounded slightly. The card 11 has planar surfaces on both sides. Seven metal contacts 15–21 are provided flush with one of the surfaces along the short edge of the card that contains the cut-off corner 13. These contacts connect with corresponding conductors of a mating socket of a host when plugged into that socket. The MMC card specification calls for the card's length to be 32 mm., its width 24 mm. and its thickness 1.4 mm. Actual MMC cards have substantially these dimensions, subject to normal manufacturing tolerances.

FIGS. 1A and 2B show a SD memory card 23. The SD specifications provide for the SD card to have the same outer dimensions in plan view as the MMC card (FIGS. 2A and 1A). But the thickness of the SD card 23 is different from the MMC card. The SD specifications call for rails 25 and 27 on opposite sides and extending completely along the length of those sides. The rail 25 is shorter than the rail 27 because of a cutoff corner 28 on the side of the card of the rail 25. The rails 25 and 27 are specified to have a thickness of 1.4 mm. and a minimum width of 0.6 mm., while a primary portion 29 of the card 23 is specified to have a thickness of 2.1 mm. Nine electrical contacts 31–39 are recessed into the top card surface in a manner to have a wall between each of them, except that the contacts 38 and 39 are positioned in a common recess. The thickness of the card in these contact recesses is specified to be 1.1 mm., the same as the thickness of the rails. Actual SD cards have substantially the dimensions given above, subject to normal manufacturing tolerances.

With reference to FIG. 3, a card holder 41, according to one embodiment, has outer surfaces 43 and 45 that have shapes that are mirror images of each other. These outer surfaces may curve gently outward about an axis that extends along the length of the holder to create the thickest portion of the card in its middle along its length, or may be substantially planar and parallel to each other. The holder 41 is made to store either a MMC or a SD card in a slot 47 that is opened at one end of the holder 41 and extends along its length to terminate adjacent a solid mass 49 of material. The MMC card 11 is shown to be positioned for insertion into the slot 47. An opening 51 is provided in one wall having the surface 43, and another opening 53 is provided in the other wall that includes the surface 45. These openings are preferably the same shape and positioned to oppose each other. Each of the openings exposes one side of a card positioned within the slot 47, in order to allow contact by one or more fingers to remove the card from the holder by sliding the card out of the holder through the edge opening of the slot 47. A hole 55 extends completely through the solid mass 49 of the holder's end, through which a key ring 57, or other attachment device, may extend. This makes it very convenient for the user to carry the holder on his or her key ring 57, along with various keys 59, but the holder is also useful to carry in some other manner such as loose in a pocket or purse.

Additional views showing the structure of the holder 41 are included as FIGS. 7, 8A and 8B. FIG. 4 shows the MMC card 11 fully inserted into the slot of the holder 41. The end of the card opposite to that containing the contacts 15–21 is inserted first. The slot 47 is sized to accept all of the card 11, so no portion of the card extends outside of the holder 41. The slot 47 is made to have a depth along the length of the card that is equal to or slightly longer than the length of the card. The card contacts 15–21 are then covered and protected. If the card 11 is oriented with its contact end inserted into the slot 47 first, which is possible, the contacts 15–21 are then exposed through the opening 51 of the holder 41, which is less desirable. In order to maintain the size of the holder 41 small, a length of the slot between its said first and second ends is made, in one specific example, to be less than 40 millimeters, have a width that is less than 30 millimeters and a thickness that is less than 3 millimeters. Of course, the slot 47 is sized to mate with a specific sized card or cards, such as the MMC or SD cards described above.

However, there are applications where it is desired to leave the inserted card contacts exposed in order to allow the card to be inserted into a receptacle slot for connection with a host system without having to first remove the card from the holder. Such a holder 41' is shown in FIG. 5, where elements corresponding to those of the holder 41 of FIG. 4 carry the same reference numbers but with an apostrophe added. The difference between the two is the formation of a notch 61 on one wall of the card carrying slot that exposes the contacts of the card 11. Although an MMC card 11 is shown in the holder, the slot 61 is made to be long and wide enough to expose all the contacts of the SD card 23 (FIGS. 2A and 2B) as well. No modification needs to be made to the opposite wall of the holder under the card. The holder 41' can be carried in the same manner as the card 41. Additional views showing the structure of the holder 41' are included as FIGS. 9, 10A and 10B.

FIG. 6 illustrates a preferred technique for a user to remove the card 11 from either of the holders 41 or 41'. The holder is held by gripping the solid end 49 (or 49') between the thumb and forefinger of one hand 63. The card 11 is then similarly gripped between the thumb and forefinger of the other hand 65 through the openings 51 (or 51') and 53 (or 53') of the holder and slid out of the slot 47 (or 47'). Either of the MMC or SD cards can be removed in this way. An alternative manner of removing a card from the holder is possible when the card includes a slot extending across its width on one major surface adjacent an end opposite to its row of contacts (not shown). Such a card can be removed by the user inserting a fingernail into the slot through one of the holder openings 51 or 53, and then urging the card out of the slot 47 by moving the nail in that direction.

The cross-sectional shape of the card accepting slots 47 and 47' are the same in each of the respective holders 41 and 41'. As best seen from FIG. 8B, a bottom portion 65 of the slot 47 is wider than a top portion 67 of the slot. The same is shown in FIG. 10B for the second embodiment. These widths, as well as the height of those slots 47 and 47', are made to be slightly larger than the dimensions of the SD card. The SD card 23, as shown in FIG. 12, completely fills the slot 47 (or 47'). And since the widths and thicknesses along the edges of the MMC and SD cards are the same, the MMC card 11 fits within the lower portion 65 (or 65') of the slot 47 (or 47'), as shown in FIG. 11, while not occupying the upper portion 67 (or 67'). Either of the cards is retained in the holder by friction forces created by a slight bending of the holder that is a result of it being made by an injection molding process.

The use of a memory card with a host system in the form of a kiosk 71 is illustrated in FIG. 13. The kiosk can have one slot 73 into which a MMC or a SD card 75 can be inserted so that the card contacts make connection with conductive pins of a card receptacle that is positioned behind the slot. A second slot 77 may be provided to receive the card holder 41' with either a MMC or a SD card therein, so that the contacts of the memory card enter a receptacle of the second slot without the need to first remove the card from the holder. Such a kiosk can be used to download music or other audio-video content onto memory cards of customers, for example. The customer selects the content and makes payment arrangements through keys 79 and a monitor 81, and possibly a slot 83 that receives a credit card.

Another embodiment of a card holder is illustrated by FIG. 14, wherein two cards may be carried at once. Two MMC, two SD or one MMC and one SD card may be inserted into two slots 91 and 93 of a card holder 95. Each of the slots 91 and 93 has the same shape of the slot 47 of FIGS. 3 and 7. An interior wall 97 between the slots 91 and 93 can be solid, or, as shown in FIG. 14, provided with an opening 99 that is lined up with the openings in the side walls. When two cards are being carried by the holder 95, it is not possible to pinch one of the cards between the thumb and forefinger to slide the card out of its holder slot. Removal is accomplished by a frictional engagement between a finger and the side of the card that is exposed through the outer carrier wall opening. Alternatively, if the card has a fingernail slot, this is used to move the card out of the slot. This is the same when only one card is present but when the wall 97 is solid. But when the opening 99 in the middle wall is present, and when only one card is being carried, that one card can be removed in the same manner as described with respect to FIG. 6.

The specific examples of the card holder have been described for use with the MMC and/or SD memory cards. Such a holder is also useful with other commercial memory cards, where various dimensions of the holder, particularly those of the card slots, are modified to match any different dimensions of the other memory cards. Further, the embodiments of the holders being described are not limited to use with memory cards but rather can also be used encapsulated integrated circuit cards that perform some other function.

Although the various aspects of the present invention have been described with respect to several specific embodiments, it will be understood that the invention is protected within the full scope of the appended claims.

It is claimed:

1. A holder for a circuit card, comprising:
a body having first and second opposing outer surfaces extending between first and second ends,
at least one slot positioned between the outer surfaces, said at least one slot being shaped to frictionally retain the card therein,
an opening at the first end of said at least one slot to the outside of the holder at the first end of the body, said at least one slot being characterized by allowing a thickness of the card to be slid therethrough by hand in order to move the card into and out of said at least one slot,
a mass as part of the body adjacent its said second end that forms a closed second end of said at least one slot,
an aperture extending through said mass between the first and second body surfaces through which a member may be inserted for attaching the holder to another object, and
a window formed through at least one of the first and second surfaces and into said at least one slot intermediate of the first and second ends of said at least one slot such that the circuit card positioned in the slot may be contacted through said window by at least one finger from outside of the body to move the card out of the holder through the opening of said at least one slot.

2. The holder of claim 1, wherein said body is characterized by being sufficiently optically transparent that printing on the card, when positioned in said at least one slot, may be read from outside of the holder.

3. The holder of claim 1, wherein said at least one slot includes at least two slots having a wall separating them that is substantially parallel to the body outer surfaces.

4. The holder of claim 1, wherein said at lest one slot has a length between its said first and second ends that is less than 40 millimeters, a width that is less than 30 millimeters and a thickness that is less than 3 millimeters.

5. The holder of claim 1, wherein said at least one slot has a cross-sectional shape along at least a portion of a distance between the first and second ends of said at least one slot that comprises first and second widths between opposing sidewalls, one of the first and second widths being less that the other such that a ledge is formed along each of the sidewalls.

6. The holder of claim 4, wherein said at least one slot has a length between said first end of said at least one slot and said closed second end of said at least one slot that is at least as long as the length of said card.

7. The holder of claim 5, wherein the first width of said at least one slot is substantially equal to 24 millimeters and the second width is substantially equal to 22.8 millimeters.

8. The holder of claim 5, wherein the ledge on each of the sidewalls extends into said at least one slot by substantially 0.6 millimeter.

9. The holder of any one of claims 1–5, wherein the opposing outer surfaces are substantially planar and parallel with each other, and further wherein said at least one slot has surfaces that are substantially planar and parallel with said opposing outer surfaces.

10. The holder of any one of claims 1–5, which additionally comprises a MMC card inserted into said at least one slot.

11. The holder of any one of claims 1–5, which additionally comprises a SD card inserted into said at least one slot.

12. The holder of any one of claim 5, wherein the holder body is made of molded plastic.

13. A met hod of utilizing the card holder of any one of claims 1–5, comprising installing,a non-volatile memory circuit card into said at least one slot and attaching the holder to a member by inserting the member through said holder aperture and through holes in a plurality of keys.

14. The holder of claim 6, wherein at least one of the body's first and second outer surfaces contains a notch at the first end thereof that exposes an end of the slot, whereby any electrical contacts along an end of the card positioned in said at least one slot are exposed.

15. The holder of claim 8, wherein a maximum thickness of said at least one slot is substantially 2.1 millimeters and a minimum thickness along said ledges is substantially 1.4 millimeters.

16. A method of utilizing the card holder of claim 14, comprising installing a non-volatile memory circuit card into said at least one slot with electrical contacts thereon being exposed through said notch, and inserting the holder and card into a receptacle such that the card electrical contacts are connected with electrical contacts of the receptacle without removing the card from the holder.

17. A holder for a circuit card, comprising:
a body having first and second opposing outer surfaces, the body having first and second ends,
the first and second opposing outer surfaces of the body extending between the first and second ends of the body,
the first and second opposing outer surfaces forming at least one slot having first and second ends,
the at least one slot being shaped so that the first and second opposing outer surfaces are operative to frictionally retain the circuit card therein,
the at least one slot having a slot opening at the first end of the at least one slot to the outside of the holder at the first end of the body, the at least one slot being operative to allow a thickness of the circuit card to be slid therethrough, the slot opening being operative to allow the circuit card to move into and out of the at least one slot, the body further having a mass adjacent to the second end of the body, the mass forming a closing of the second end of the at least one slot, the mass having an aperture extending therethrough, the aperture being operative to receive a member, the member being operative to attach the holder to another object, at least one of the first and second opposing outer surfaces of the body having an outer surface opening operative to admit at least one finger from outside of the body to contact the circuit card, the outer surface opening further operative to admit the least one finger to move the circuit card out of the holder through the slot opening at the first end of the at least one slot, whereby the circuit card may be removably held in the holder.

18. The holder of claim 17 wherein
the body is formed from transparent material.

19. The holder of claim 17 wherein
the at least one slot includes at least two slots, the holder further having a wall separating the at least two slots, the wall being substantially parallel to the first and second opposing outer surfaces.

20. The holder of claim 17 wherein
the at least one slot has a length of less than 40 millimeters; the at least one slot further has a width of less than 30 millimeters and the at least one slot further has a thickness of less than 3 millimeters.

21. The holder of claim 17 wherein
the at least one slot has a length of at least the length of the circuit card.

22. The holder of claim 17 wherein
a particular slot selected from the at least one slot has a cross sectional shape that is operative to be substantially completely filled by insertion of an SD circuit card.

23. The holder of claim 21 wherein
at least one of the first and second opposing outer surfaces has a notch at the first end of the body, the notch exposing the first end of the at least one slot, whereby a plurality of electric contacts on an end of the circuit card may be exposed.

24. The holder of claim 22 wherein
the particular slot has a first width substantially equal to 24 millimeters and a second width substantially equal to 22.8 millimeters.

25. The holder of claims 17, 18, 19, 20, 21, 23, 22, or 24 wherein
the first and second outer opposing surfaces are substantially planar parallel and wherein
the at least one slot has surfaces that are substantially planar and parallel with the first and second outer opposing surfaces.

26. A method of utilizing the card holder of claims 17, 18, 19, 20, 21, 23, 22, or 24 comprising;
installing a non-volatile memory circuit card into said at least one slot and attaching the holder to a member by inserting the member through said holder aperture and through holes in a plurality of keys.

27. A method of utilizing the card holder of claim 25 comprising:
installing a non-volatile memory circuit card into the at least one slot with electrical contacts thereon being exposed through the notch, and inserting the holder and the circuit card into a receptacle such that the circuit card electrical contacts are connected with electrical contacts of the receptacle, the inserting being performed without removing the circuit card from the holder.

* * * * *